(12) United States Patent
Davenport (10) Patent No.: US 6,169,349 B1
(45) Date of Patent: Jan. 2, 2001

(54) ELECTROMAGNET TYPE SEGMENTED FIELD DC MOTOR

(76) Inventor: Norban Earl Davenport, P.O. Box 778, Bullhead City, AZ (US) 86430

( * ) Notice: Under 35 U.S.C. 154(b), the term of this patent shall be extended for 0 days.

(21) Appl. No.: 09/431,819

(22) Filed: Nov. 2, 1999

(51) Int. Cl.[7] ................................. H02K 16/00
(52) U.S. Cl. ..................... 310/114; 310/68 R; 29/59
(58) Field of Search ..................... 310/181, 112, 310/114, 68 R, 163, 161, 180, 184, 185, 198, 67 R; 29/596

(56) References Cited

U.S. PATENT DOCUMENTS

| | | | |
|---|---|---|---|
| 1,871,446 | 8/1932 | Decker | 310/27 |
| 2,442,626 * | 6/1948 | Tolson et al. | 310/163 |
| 3,292,065 | 12/1966 | Fredrickson | 318/135 |
| 3,482,124 | 12/1969 | Pelenc | 310/12 |
| 3,700,943 | 10/1972 | Heintz et al. | 310/168 |
| 3,707,924 | 1/1973 | Barthalon et al. | 104/290 |
| 3,721,874 | 3/1973 | Pelenc et al. | 318/135 |
| 3,829,746 | 8/1974 | Van et al. | 318/135 |
| 3,864,588 | 2/1975 | Inaba | 310/266 |
| 3,894,275 | 7/1975 | Baumans et al. | 318/38 |
| 4,031,421 | 6/1977 | Geiger | 310/112 |
| 4,057,736 | 11/1977 | Jeppson | 307/78 |
| 4,137,473 | 1/1979 | Pfister | 310/98 |
| 4,280,072 | 7/1981 | Gotou et al. | 310/67 R |
| 4,307,310 | 12/1981 | Wedman et al. | 310/177 |
| 4,330,727 | 5/1982 | Oudet | 310/268 |
| 4,381,465 | 4/1983 | Renkl et al. | 310/99 R |
| 4,408,138 | 10/1983 | Okamoto | 310/12 |
| 4,423,361 * | 12/1983 | Stenudd et al. | 318/135 |
| 4,545,117 | 10/1985 | Okamoto | 29/596 |
| 4,633,108 | 12/1986 | von der Heide | 310/12 |
| 4,678,971 | 7/1987 | Kanazawa et al. | 318/135 |
| 4,695,777 | 9/1987 | Asano | 318/130 |
| 4,704,553 | 11/1987 | Resnicow | 310/12 |
| 4,755,698 | 7/1988 | Frister et al. | 310/51 |
| 4,823,040 | 4/1989 | Oudet | 310/268 |
| 4,837,474 | 6/1989 | Petersen et al. | 310/254 |
| 4,885,492 | 12/1989 | Van Sickle | 310/113 |
| 4,922,142 | 5/1990 | Givier, Jr. et al. | 310/12 |
| 4,931,677 | 6/1990 | Heidelberg et al. | 310/12 |
| 4,972,112 | 11/1990 | Kim | 310/81 |
| 4,990,809 | 2/1991 | Artus et al. | 310/192 |
| 5,177,391 | 1/1993 | Kusase | 318/254 |
| 5,177,416 | 1/1993 | Inaji et al. | 310/263 |
| 5,204,574 | 4/1993 | Kanno et al. | 310/233 |
| 5,214,336 | 5/1993 | Schmidt et al. | 310/254 |
| 5,235,225 | 8/1993 | Colgate et al. | 310/12 |
| 5,254,896 | 10/1993 | Bradfield et al. | 310/263 |
| 5,292,284 | 3/1994 | Denk et al. | 464/29 |
| 5,475,277 * | 12/1995 | Johnson | 310/156 |
| 5,545,936 * | 8/1996 | Davenport | 310/12 |
| 5,739,612 | 4/1998 | Davenport | 310/113 |

* cited by examiner

Primary Examiner—Nestor Ramirez
Assistant Examiner—Joseph Waks
(74) Attorney, Agent, or Firm—Frank J. McGue

(57) ABSTRACT

A pancake type direct current motor is disclosed which comprises a motor drive shaft with one or more rotor assemblies secured along the motor drive shaft. An even number of spaced stator poles surrounds each of the one or more rotor assemblies. Each stator pole has an associated excitation winding, with all of the stator poles of a given stator assembly having the same polarization (i.e. north or south). Each of the one or more rotor assemblies comprises at least two pairs of rotor legs uniformly space and extending radially outward from the motor drive shaft. The angular spacing between each of said pairs of rotor legs being equal to or somewhat less than the spacing between adjacent stator poles. Each one of a pair of rotor legs has an excitation winding. The excitation windings of the two legs are oppositely polarized so that successive stator poles about the rotor are alternating north and south poles. A rotor position sensor reports the instant rotor position to a sequencing and control system. The control system responds to the rotor position by energizing and de-energizing the excitation windings to sustain the operation of the motor.

5 Claims, 6 Drawing Sheets

| Period | Rotor | Stator Poles | | | | | | | |
|---|---|---|---|---|---|---|---|---|---|
| * | ** | ST1 | ST2 | ST3 | ST4 | ST5 | ST6 | ST7 | ST8 |
| P1 | On | Off | On | Off | On | Off | On | Off | On |
| P2 | On | On | Off | On | Off | On | Off | On | Off |
| P3 | On | Off | On | Off | On | Off | On | Off | On |
| P4 | On | On | Off | On | Off | On | Off | On | Off |
| P5 | On | Off | On | Off | On | Off | On | Off | On |
| P6 | On | On | Off | On | Off | On | Off | On | Off |
| P7 | On | Off | On | Off | On | Off | On | Off | On |
| P8 | On | On | Off | On | Off | On | Off | On | Off |
| | | | | | | | | | |
| *R1 Position | **all four poles | | | | | | | | |

ELECTROMAGNET TYPE SEGMENTED FIELD DC MOTOR

BACKGROUND OF THE INVENTION

The present invention generally relates to electrical machines of the rotary type and, more particularly, to motors powered by direct current, preferably supplied from batteries.

DESCRIPTION OF THE PRIOR ART

Electrical motors are currently used to provide motive power in many familiar devices ranging from small actuators to large industrial systems and including transportation vehicles such as urban railroads. In many cases, provision of electrical power to such motors presents no serious problem such as in stationary motor installations or where the power requirements are small and battery power is feasible and relatively economical. In transportation vehicles, however, some difficulties arise due to the mobile nature of the application and the amount of power required. For that reason, the use of electrical motors in vehicles has only become widespread where power can be supplied through a stationary structure to which the vehicle's motion is constrained, such as in electrically powered railway vehicles.

If the vehicle motion is not so constrained, as in automobiles, power must be provided from batteries which are carried in the vehicle, adding significantly to vehicle weight in an amount often comparable to or greater than the payload of the vehicle. During use of the vehicle, the weight of the vehicle and payload, as well as the batteries, must be accelerated repeatedly, requiring substantial amounts of power simply for the transportation of the batteries themselves. Accordingly, efficiency of the motor becomes of paramount importance in such applications in order to develop an acceptable range and operating time of the vehicle for each recharge of the batteries.

The ability to control operating speed of a motor is also of special importance in many applications, including transportation vehicles. While alternating current motor designs have been able to achieve relatively high efficiencies, motor speed in alternating current machines is largely controlled by the frequency of the voltage used to power the machines and only a limited amount of slip (e.g. in induction motors) is tolerable. Variation of the power supply frequency is often impractical where the power is drawn from commercial electric power distribution systems and, in any event, the apparatus necessary for power frequency control over a wide range is extensive and eliminates much of the efficiency advantages of alternating current machines in applications where variable speed is required.

Direct current machines, on the other hand, can provide speed control by control of input voltage relative to the load with relatively simple electrical circuitry. In traditional DC motors using commutators, the geometry of the stator and rotor fields is substantially fixed and torque and speed vary with the applied voltage, the load which must be driven and the windage and other losses in the motor, itself.

In designs of stepping motors and in pancake motor designs, in particular, magnetic elements such as permanent magnets or elements of high permeance material are placed at periodically spaced locations on a rotor disk and a sequence of pulses applied to stators located periodically around the rotor and in registration with the path of the magnetic elements in order to attract and/or repel them to cause rotary motion of the rotor.

The availability of such d-c motors is particularly of interest at the present time for use in electric automobiles which are considered to offer a promising solution of the environmental problems associated with gasoline powered automobiles.

U.S. Pat. No. 5,545,936, issued Aug. 13, 1996 to the author of the present invention utilizes a pancake-like structure with the stators distributed about the circumference of the rotor in a manner similar to the arrangement of the presently disclosed structure. The present invention, however, employs pulsed electromagnets in the rotor whereas the device of U.S. Pat. No. 5,545,936 is a reluctance type machine.

SUMMARY OF THE INVENTION

It is, therefore, an object of the present invention to provide a relatively high power motor that is operable from a relatively low voltage d-c source.

It is another object of this invention to provide such a motor in a form which is readily adaptable to applications requiring precise speed control over a wide range.

It is a further object of this invention to provide such a motor which will operate at high electrical efficiency.

A still further object of this invention is to provide such a motor in compact and light-weight form relative to its power capability.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
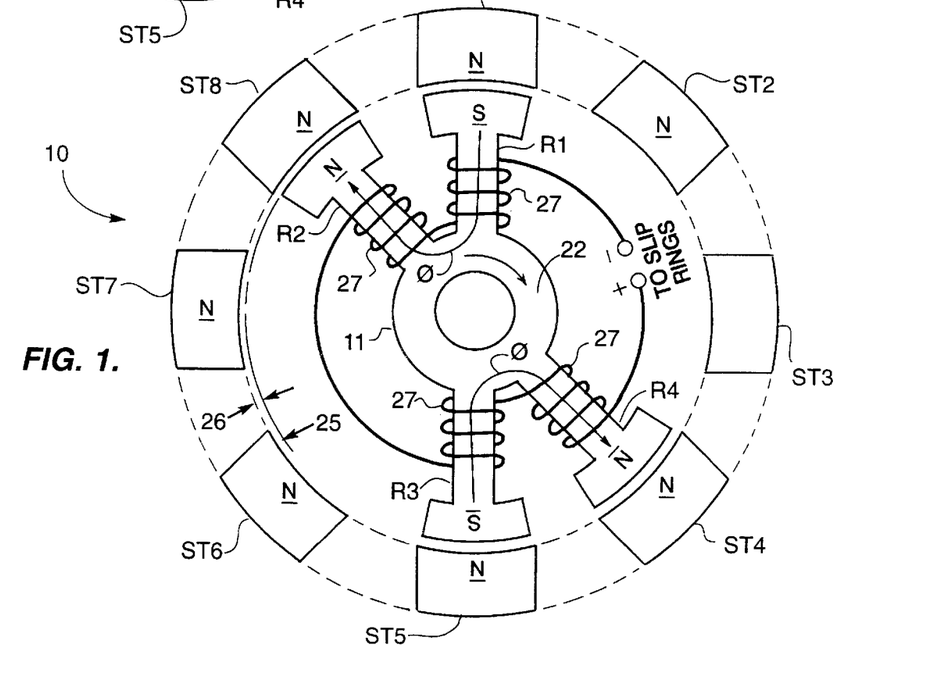
FIG. 1 is a functional illustration of a first version of the motor of the invention, this simplest form of the invention incorporating two pairs of rotor legs per rotor assembly.
Figure 2:
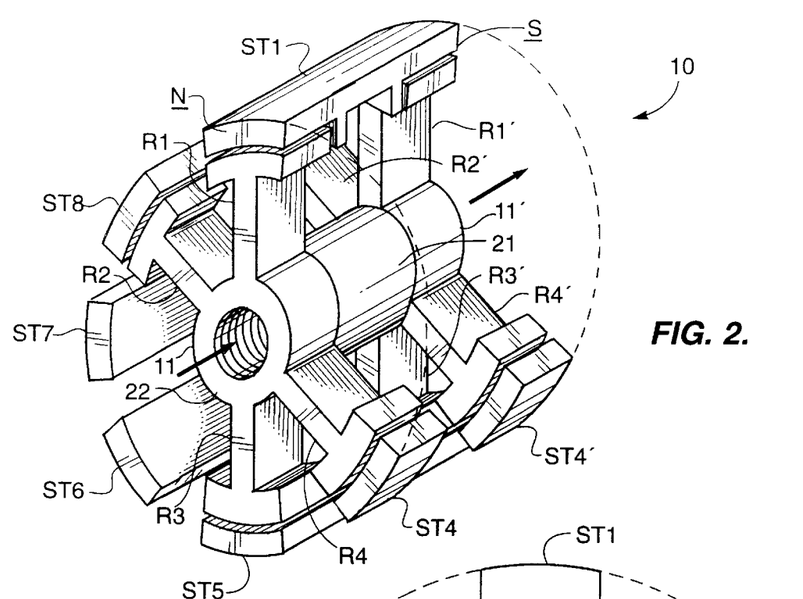
FIG. 2 is a partially cut-away perspective drawing illustrating the geometries and physical arrangements of the rotor and stator magnetic core structures of the motor.
Figure 3:
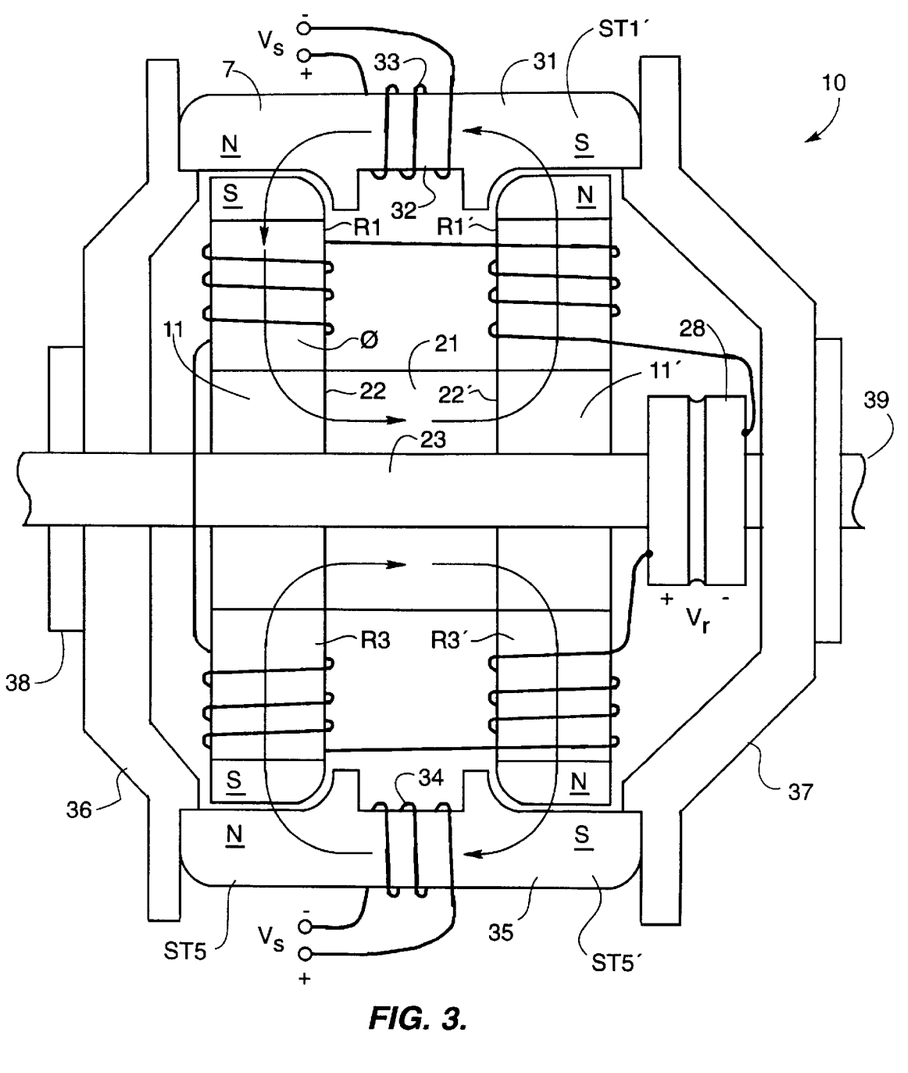
FIG. 3 is a longitudinal cross-sectional view of the motor of the invention illustrating additional details of construction including rotor and stator excitation.

Referring more particularly to the drawings by characters of reference, FIGS. 1–3 illustrate the basic structure of the preferred embodiment of the d-c motor 10 of the invention. The motor 10 which takes the general form of a pancake motor or a stack of pancake motors, comprises two rotor assemblies 11 and 11' (as shown in FIG. 2 less their excitation windings) and eight stator members, ST1–ST8 (again as shown in FIG. 2 with excitation windings omitted and with stator members ST2–ST4 omitted to avoid obscuring other structural details). A magnetic spacer ring 21 separates the two rotor assemblies.

Each rotor assembly comprises a central magnetic ring 22 and four rotor legs, R1–R4. R1 and R2 form a first pair of legs; R3 and R4 form a second pair. The two pairs of legs are positioned diametrically opposite each other relative to the drive shaft 23 (FIG. 3) which passes through the central openings of spacer ring 21 and rings 22 of rotor assemblies 11 and 11'. The two legs of each pair are spaced 45 degrees (or less) apart with R1 and R3 linearly aligned and with R2 and R4 linearly aligned, all four legs extending radially outwardly relative to the shaft 23.

Each of the rotor legs R1–R4 has the general shape of a capital "T" with its top, radially-outward surface arcuately shaped to track the cylindrical inner bound 25 of the motor air gap 26 (FIG. 1).

The eight stator members ST1–ST8 are uniformly spaced 45 degrees apart about the air gap. The width of each stator covers approximately 20 mechanical degrees, roughly matching the width of the top member of the T-shaped rotor leg.

As shown in FIG. 1, each rotor leg, R1–R4 of rotor assembly 11 carries a rotor excitation winding 27. The four excitation windings are shown serially connected across motor slip rings 28 (FIG. 3). As indicated in FIG. 1, the windings 27 of alternate rotor legs are oppositely polarized to produce alternate north (N) and south (S) rotor poles. Thus, for example, R1 becomes a south pole and R2 becomes a north pole with flux $\phi_r$ flowing inwardly through leg R1 and flowing outwardly through leg R2. The excitation windings may be designed for serial connection as shown or they may be designed for parallel connection, as appropriate for a given application.

FIG. 3 shows the means by which stator excitation is provided for stators ST1 and ST5 and for the corresponding stators, ST1' and ST5' associated with rotor legs R1' and R3'. Stator core member 31 which spans the air gap surfaces of rotor legs R1 and R1' of rotor assemblies 11 and 11', respectively, has a centered rectangular depression 32 which receives a stator excitation winding 33. Winding 33 is connected across the terminals of a sequence and control circuit which provides a control voltage Vs, yet to be addressed. The resulting current passing through the winding 33 drives a flux, $\phi$, which passes through the center of winding 33 to ST1, across the air gap, through rotor leg R1, through central ring 22 of rotor 11, through spacer ring 21, central ring 22' of rotor leg R1', through the R1'/St1' air gap to ST1' and back through the center of winding 33. This establishes stator ST1 as a north (N) pole and ST1' as a south (S) pole. In the same manner. ST5 and ST5' are excited by means of a stator excitation winding 34 wound on stator core member 35. Six additional stator core members and associated excitation windings provide excitation for the remainder of stator poles (ST2–ST4, ST6–ST8, and the corresponding poles associated with rotor assembly 11'.

It will be noted at this point that the angularly aligned stators ST1 and ST1' are oppositely polarized, i. e. ST1 is a north (N) pole while ST1' is south (S) pole; ST2 is a south pole while ST2' is a north pole, etc. For this reason, corresponding legs of rotor assemblies 11 and 11' must also be oppositely polarized, i. e. R1 is a south pole, R1' a north pole, R2 is a north pole, R2' is a south pole, etc.

Additional details of the motor assembly, as shown in FIG. 3, include the left and right housing members 36 and 37 which support the stator core members, and drive shaft bearings 38 and 39. Rotor excitation is supplied by brushes (not shown) which ride upon the slip rings 28.

Operation of the motor 10 is based upon the well-known principle that like poles (two north poles or two south poles) repel each other while two unlike poles (one north pole and one south pole) attract each other.

FIGS. 4A–4D are useful in the determination of rotor and stator excitation sequencing requirements. The four figures show plan views of the motor 10 for four different rotor positions. As the rotor turns, it passes through eight sectors or periods in the course of each revolution, each period covering 45 degrees of rotation bounded by the center lines of two adjacent stator poles. The center line of rotor leg R1 is employed as the rotational reference as indicated by the arrow 37.

Figure 4A:
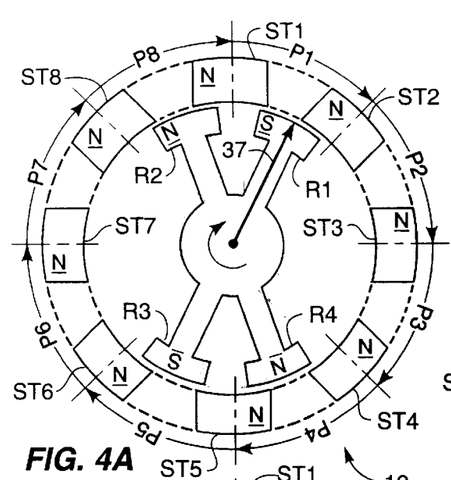
FIGS. 4A–4D are functional illustrations of the motor for different rotor positions, these illustrations being useful in the determination of rotor and stator excitation sequencing as required for effective and efficient motor operation.

FIG. 4A shows rotor R1 passing through period P1 and rotating clockwise. As indicated by table 38, all rotor poles R1–R4 are energized during period P1 and they remain energized throughout the complete revolution. The individual stator poles, however, are turned on or off during each period as appropriate for driving the rotor in the clockwise direction.

As shown in FIG. 4A, rotor leg R1 is polarized as a south pole and is thus attracted by stator poles ST1 and ST2 when these stator poles are energized, with Sta urging R1 counter-clockwise and ST2 urging R1 in the clockwise direction. For clockwise rotation, ST1 is de-energized or turned off while ST2 is turned on as shown for period P1 of table 38.

Stator ST3 does not immediately interface with any rotor pole during P1 and is therefore turned off during this period, again as shown in table 38.

Rotor leg R4, which is energized as a north pole is repelled by both stator poles ST4 and ST5 with ST4 urging the rotor clockwise and ST5 urging the rotor in the counter-clockwise direction. ST4 is thus turned on and ST5 is turned off for clockwise rotation.

Stator pole ST6 attracts the oppositely polarized rotor leg R3 urging R3 clockwise and is therefore turned on during period F1, again as shown in table 38.

ST7 does not immediately interface a rotor pole during P1 and is therefore turned off as indicated.

ST8 repels the north pole or rotor leg R2 urging the rotor clockwise and is therefore turned on during P1.

Figure 4B:
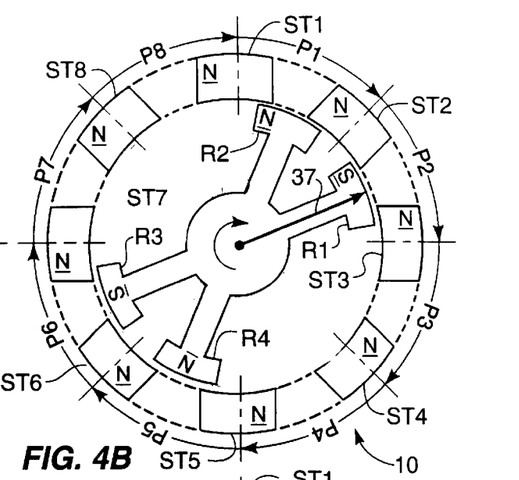

During period P2 as shown by FIG. 4B, stator poles ST1, ST3, ST5 and ST7 urge the rotor clockwise and are therefore turned off. Stators ST4 and ST8 do not interface the rotor during period P2 and are also turned off.

Figure 4C:
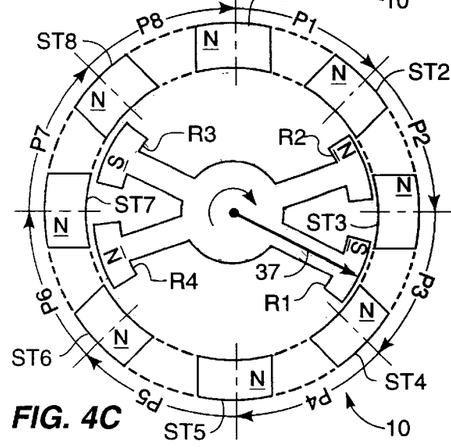
Figure 4D:
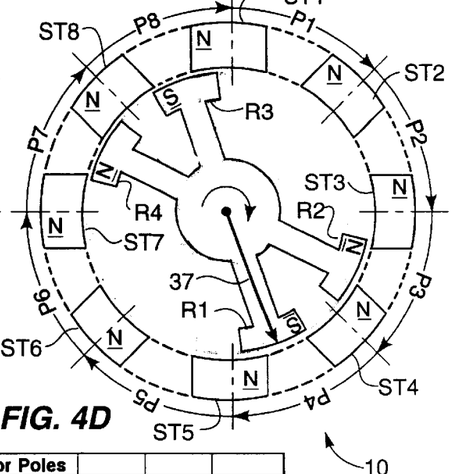

The same procedure is applied to periods P3 and P4 as illustrated, respectively, by FIGS. 4C and 4D, and the same procedure is employed for the remaining periods, P5–P8.

Figure 5:
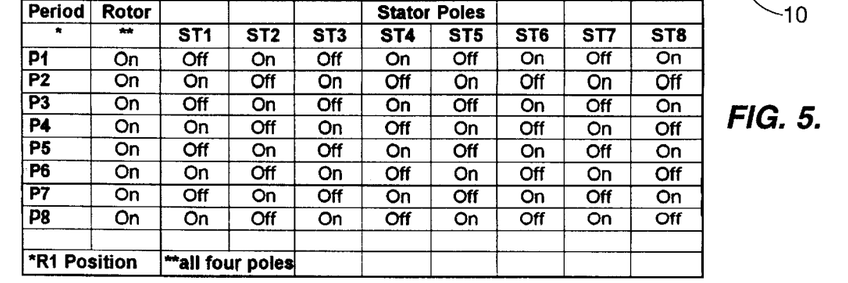
FIG. 5 is a tabulation of rotor and stator excitation conditions as determined from FIGS. 4A–4D and from an extension of this procedure through a complete rotor revolution.

The motor 10 can also be made to rotate in the counter-clockwise direction by appropriately energizing and de-energizing the stator poles. For counter-clockwise rotation the rotor poles will again be energized continuously and the stator poles will be turned on and off in a pattern that is complementary to that of table 38, i. e. those stators that are turned off during nay given period for clockwise rotation will be turned on for counter-clockwise rotation and those that are turned on for clockwise rotation will be turned off for counter-clockwise rotation.

The conditions shown in table 38 for rotor poles R1–R4 and for stator poles ST1–ST8 apply also to rotor poles R1'–R4' and stator poles ST1'–ST8', respectively.

Figure 6:
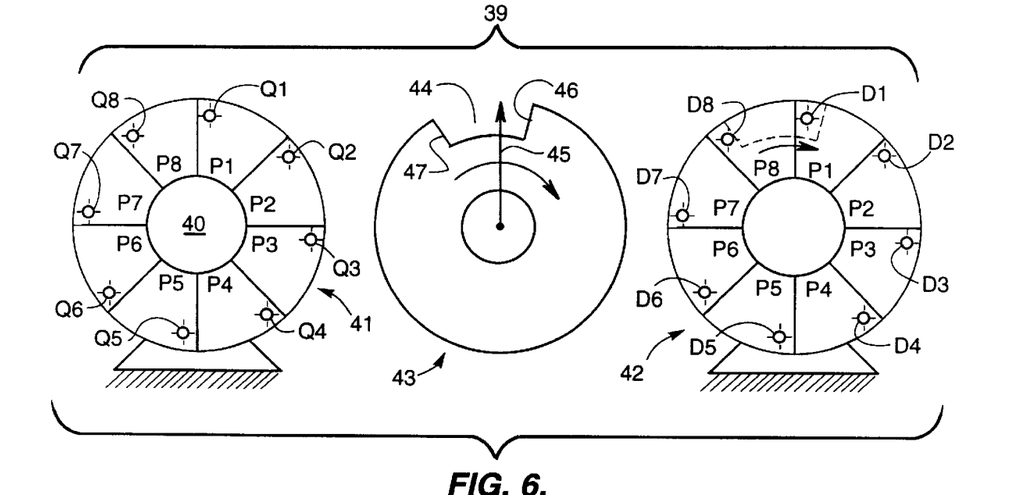
FIG. 6 illustrates an optical sensor arrangement that may be employed to identify the instant rotor postion as needed to control rotor and stator excitations in the manner defined in FIG. 5.

In order to control the rotor and stator excitation in accordance with table 38, it is necessary to identify at all times the instant rotor position. A position sensor 39 for identifying the instant position of the rotor is shown in FIG. 6. The position sensor 39 comprises a sensor plate 41, a light source plate 42 and a revolving shield 43.

Sensor plate 41 comprises a stationary disk secured to the frame of the motor in alignment with the eight stator poles, ST1–ST8, the central openings 40 providing clearance for the motor drive shaft 23. Mounted on the disk in a circle about the periphery of the disk are eight photo-transistors, Q1–Q8, each transistor occupying a sector of the disk corresponding with one of the eight periods, P1–P8, respectively, of FIGS. 4A–4D at a location just clockwise of the counter-clockwise edge of each period.

Light source plate 42 is identical with sensor plate 41 except that, in place of the eight transistors of the sensor plate, the light source plate has eight light-emitting diodes (LEDs). In the mounted positions of sensor plate 41 and light source plate 42, the eight LEDs, D1–D8, are aligned, respectively, with the eight photo-transistors, Q1–Q8 of sensor plate 41.

Revolving shield 43 comprises a metal disk approximately the same diameter as sensor plate 41 and light source plate 42. A 45 degree window 44 is cut into the outer edge of the disk.

Sensor plate 41 and light source plate 42 are mounted in close alignment with each other, the photo-transistors facing the corresponding LEDs so that with no opaque intervening shield the photo-transistors will be turned on. The two plates 41 and 42 are spaced just far enough apart to allow clearance for the revolving shield 32 to be mounted in between.

Shield 43 is secured to the motor drive shaft 23 angularly referenced with respect to rotor leg R1 such that the arrow 45 shown in FIG. 6 is aligned with arrow 37 of FIGS. 4A–4D. In the rotational position of shield 43 shown in FIG. 6 with the rotor and shield rotating in the clockwise direction the leading edge 46 of window 44 has just uncovered D1 turning on photo-transistor Q1 and signaling the entry of rotor leg R1 into period P1 (note the broken line reflection 44' of window 44 on light source plate 42). With another 45 degrees or rotation, the trailing edge 47 of window 44 will cover diode D1 to signal the end of period P1 as the leading edge 46 uncovers diode D2 to signal the beginning of period P2.

Figure 7:
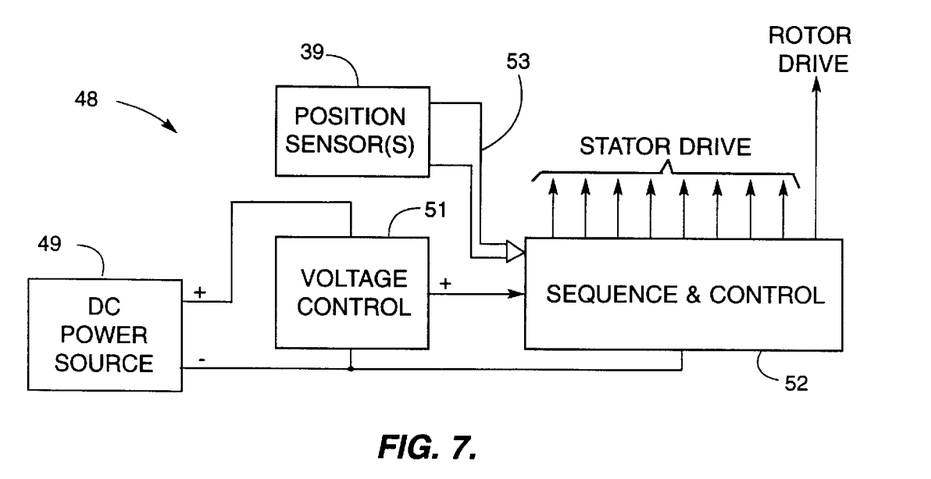
FIG. 7 is a block diagram illustrating the power and control system of the motor.

The block diagram of FIG. 7 illustrates the sequencing and control system 48 employed for the operation of motor 10. The functional blocks of system 48 comprise a d-c source 49, a voltage control means 51, positioning sensor 39 and sequence and control network 52.

The d-c source 49 might be rectified a-c from a utility power line or in the case of portable or mobile applications it might be a battery or a bank of batteries. In the latter case, recharging means might be incorporated.

Voltage control means 51 will typically include efficient means for controlling the amplitude of the voltage supplied to the motor 10. Various types of d-c to d-c converters including time ratio control circuits and resonant converters are commonly employed for this purpose. For applications such as the electric automobile, the control means 51 would be responsive to the accelerator pedal of the automobile.

The position sensor 39 is preferably of the type already described as shown in FIG. 6. Its several output signals 53 supply a continuous indication of the instant location of the rotor, identifying the particular period in which rotor leg R1 operating (i.e. one of the periods, P1–P8 of FIGS. 4A–4D).

The sequence and control network 52 responds to the signals 53 from position sensor 39, supplying stator and rotor drive voltages (excitation voltages) to the motor 10 as called for during each operating period in accordance with the table of FIG. 5. The network 52 may also incorporate means for motor start-up as well as directional control means (clockwise or counter-clockwise). A micro-processor might be employed for this purpose.

A preferred embodiment of the d-c motor of the invention together with associated power and control means has now been disclosed in accordance with the stated objects of the invention, and while the preferred embodiment has been described as comprising a specific number of rotor and stator assemblies, various other motor configurations are considered to embody the principles and teachings of the invention.

FIGS. 1–3 and 4A–4D disclose as the first embodiment a motor 10 comprising two rotors 11, 11', each having two pairs of rotor poles interacting with eight stator poles.

Figure 8:
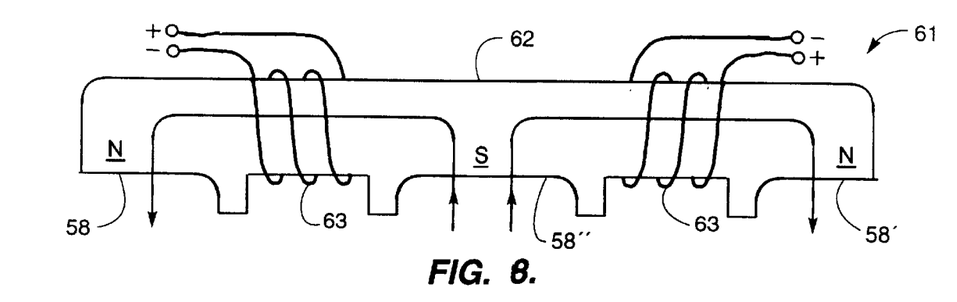
FIG. 8 is a functional illustration of a second version of the motor of the invention, this version incorporating three pairs of rotor legs per rotor assembly.
Figure 9:
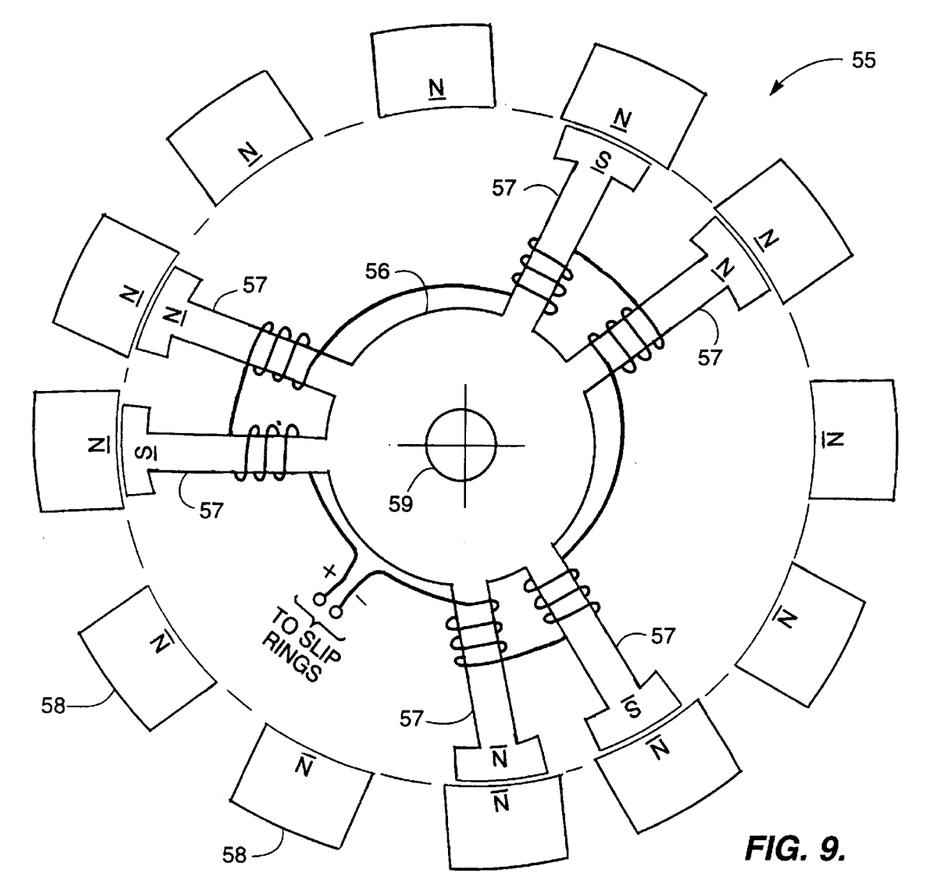
FIG. 9 is functional illustration of one of the several stator assemblies employed in a motor assembly comprising three rotor assemblies of the type illustrated in FIG. 8.

FIGS. 8 and 9 disclose as a second embodiment a motor 55 preferably comprising three rotor assemblies 56, each rotor assembly having three pairs of rotor legs or poles 57 interacting with twelve stator poles 58. As in the case of the first embodiment, the twelve stator poles encircle the rotor with all twelve poles polarized as north poles. Each pair of rotor poles comprises a north pole and a south pole spaced 30 degrees or less apart, the three pairs of rotor poles being uniformly spaced about the drive shaft 59.

The stator poles 58 which interact with the three rotor assemblies are energized by twelve stator assemblies 61 of the type shown in FIG. 9, each assembly comprising an elongated magnetic core 62 with like poles 58 and 58' at the ends and an oppositely polarized pole 58" at the center. An excitation winding 63 is positioned on each side of the central pole. Adjacent stator poles lengthwise of the motor shaft are oppositely polarized from that shown in FIG. 8. In the motor assembly, the stator assemblies 61 are positioned longitudinally in parallel with the drive shaft each providing a stator pole 58 for each of the rotor assemblies 56.

Figure 10:
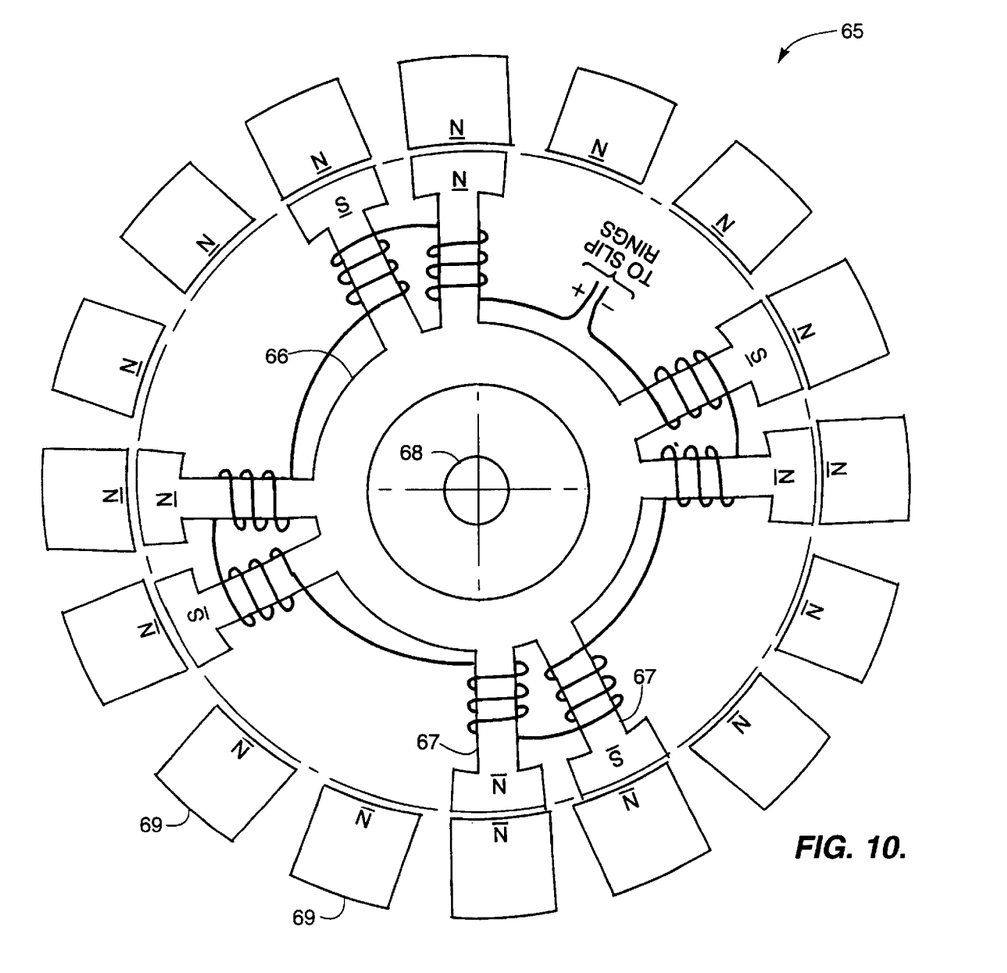
FIG. 10 is a functional illustration of a third version of the motor of the invention, this version incorporating four pairs or rotor legs per rotor assembly.

Yet another embodiment of the invention is shown in FIG. 10 in the form of a motor 65 comprising four rotor assemblies, 66 each having four pairs of rotor legs 67. The two legs 67 of each pair are spaced 22.5 degrees or less apart and the three pairs of rotor legs are uniformly spaced about the drive shaft 68. The four pairs of rotor legs are again alternately polarized, north and south, and the eight poles of each rotor assembly interact with sixteen stator poles 69 which encircle the rotor assembly. As in the case of the first and second embodiments the stators which interact with a given rotor are all of the same polarization while adjacent rotor poles and associated stator poles lengthwise of the motor shaft are oppositely polarized.

Figure 11:
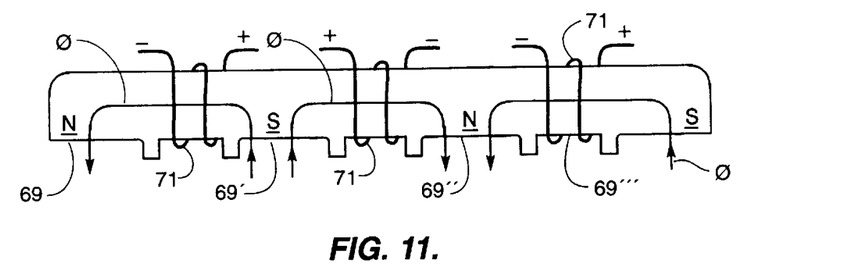
FIG. 11 is a functional illustration of a stator assembly of the type employed in the motor of FIG. 10.

As indicated in FIG. 11, the stator care for motor 65 of FIG. 10 serves all four rotors of motor 10 with its four stator poles 69, 69', 69" and 69"' aligned longitudinally of motor 65 and its drive shaft 68. Also as shown, the corresponding poles of successive rotors are alternately polarized, north, south, north south. Excitation is provided by means of excitation windings 71 positioned between adjacent poles (i.e. between poles 69 and 69', between 69' and 69" and between 69" and 69'''). Polarization of the windings 71 is indicated by the polarity indicators (+ and -). The three windings will all be turned on or off together and may therefore be connected in series or in parallel as appropriate for the given design.

The three embodiments of the invention as described herein define motor assemblies having twice as many stator poles as rotor poles. Additional variations of these embodiments ae considered to fall within the scope of the invention, such variations incorporating equal numbers of rotor and stator poles. For such embodiments of the invention, the sequencing and control systems would be essentially the same as described for the first embodiment but there would be no inactive stator poles during the energized periods of rotor and stator poles.

The three embodiments of the invention described thus far include a two-rotor version, a three-rotor version and four-rotor version. Yet another version is contemplated which employs only single rotor assembly and a surrounding ring of stator poles. The rotor assembly in this embodiment might be any one of the three rotor assemblies of FIGS. 1, 8 or 10. A magnetic disc would replace the second rotor assembly of the two rotor version for the closure of the stator flux paths.

Further extensions of these embodiments incorporating still larger numbers or rotor assemblies, each with additional numbers of rotor pairs are possible.

It will now be recognized that a new and different motor design is provided in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. A pancake type d-c motor comprising:

a motor drive shaft, two or more rotor assemblies secured along the motor drive shaft each of the two or more rotor assemblies comprising at least two pairs of rotor legs being uniformly spaced about and extending radially outwardly from said motor drive shaft, a number of stator poles surrounding of said two or more rotor assemblies, the number being at least twice the total number of rotor legs of each of said two or more rotor assemblies, the stator poles being uniformly spaced about each of said rotor assemblies, with all of said stator poles associated with a given rotor assembly being of the same polarization, wherein an angular spacing between each of the rotor legs of each of said two or more pairs of rotor legs being equal to or less than an angular spacing between adjacent stator poles, said rotor legs having associated excitation windings which, when energized, cause the two legs of each pair of rotor legs to be oppositely polarized whereby outward ends of said rotor legs are rendered alternately south and north poles about the periphery of said rotor assembly, said rotor assemblies and their associated stator poles being uniformly spaced along said motor drive shaft, their rotor and stator poles being aligned with the corresponding rotor and stator poles of adjacent of said rotor and stator assemblies, and said corresponding rotor and stator poles of said adjacent rotor and stator assemblies being oppositely polarized as north and south poles, a rotor position sensor reporting instant rotor positions to a sequencing and control system, the sequencing and control system responding to identified rotor positions, selectively energizing and de-energizing said excitation windings of said stator poles as appropriate for sustaining the operation of said motor.

2. The d-c motor of claim 1 wherein:

said rotor position sensor comprises a stationary light source plate, a stationary sensor plate, and a revolving shield coupled to said motor drive shaft, said light source plate having a number of light sources equal to the number of stator poles surrounding said rotor assembly, each of said light sources being associated with and aligned with a spacing or a period between center lines of adjacent stator poles, there being one light source for each said spacing or period, said sensor plate having an optical sensor for each of said light sources of said light source plate, said revolving shield comprising a circular disk with a window cut into a periphery in the form of a sector approximately equal in width to the spacing between adjacent stator poles, said sensor plate and said light source plate being mounted side by side, each of said light sources facing and aligned with a corresponding optical sensor, said revolving shield being interposed between said sensor plate and said light source plate so that, as said rotor revolves, said window of said revolving shield provides an opening between successive light sources and their corresponding photo sensors, and said photo sensors responding and serving thereby as means for identifying an instant position of said rotor.

3. The d-c motor of claim 2 wherein:

each of said rotor assemblies has two pairs of said rotor legs uniformly spaced about said motor drive shaft.

4. The d-c motor of claim 2 wherein:

each of said rotor assemblies has three pairs of said rotor legs uniformly spaced about said motor drive shaft.

5. The d-c motor of claim 2 wherein:

each of said rotor assemblies has four of said pairs of rotor legs uniformly spaced about said motor drive shaft.

* * * * *